Patented Apr. 21, 1953

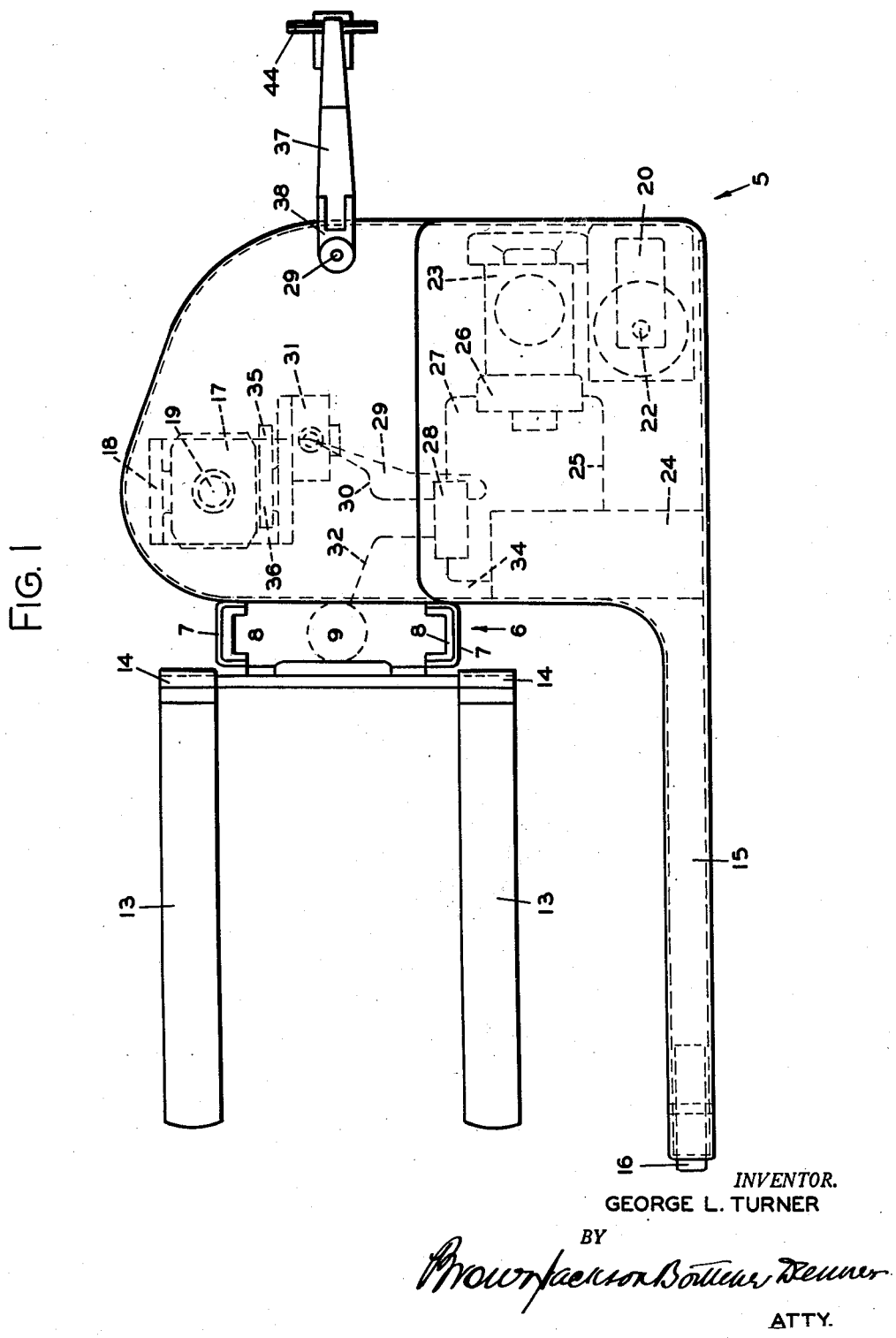

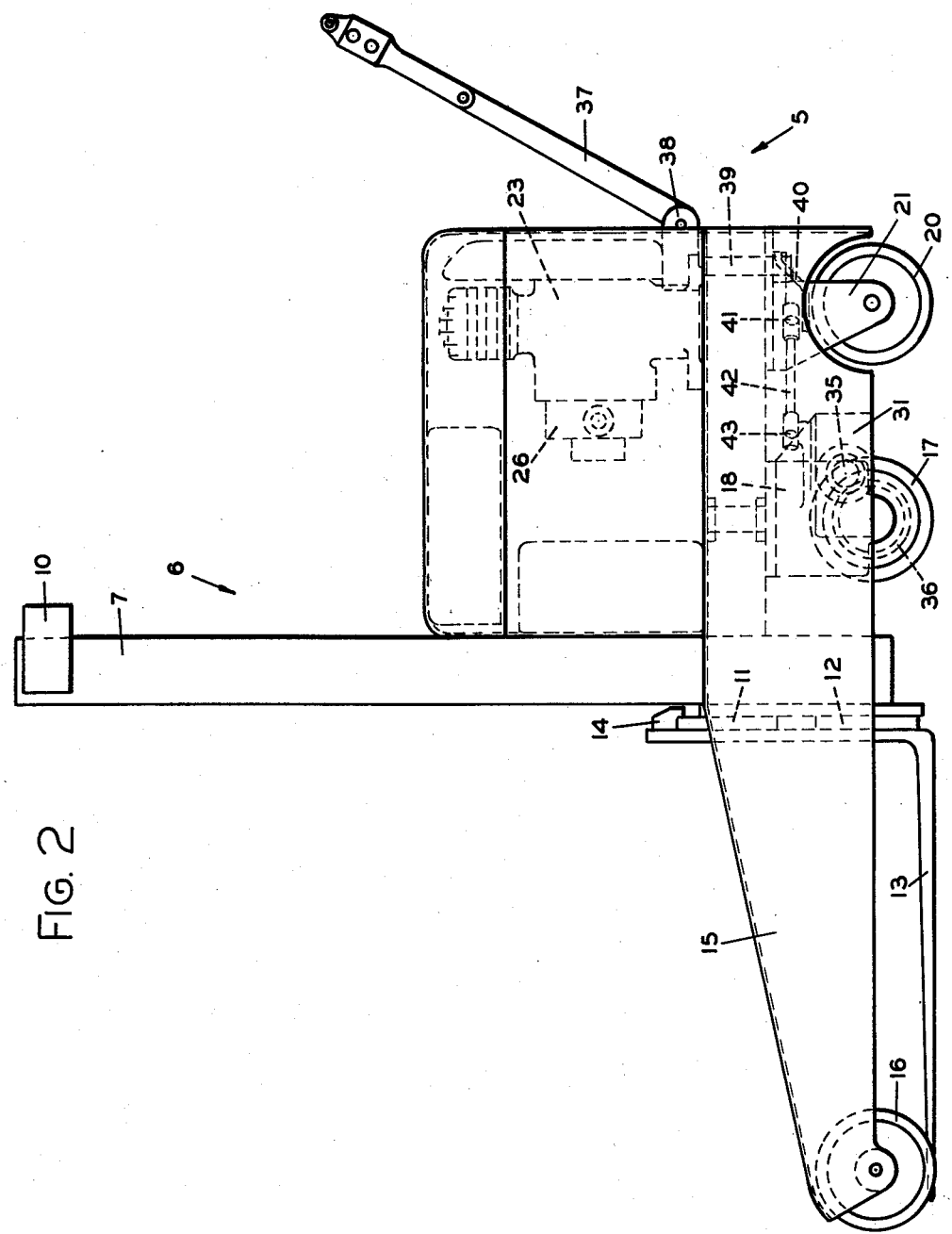

2,635,711

UNITED STATES PATENT OFFICE 2,635,711

HAND LIFT TRUCK

George L. Turner, Buchanan, Mich., assignor to Clark Equipment Company, Buchanan, Mich., a corporation of Michigan Application August 27, 1949, Serial No. 112,660

7 Claims. (Cl. 187—9)

My invention relates to hand lift trucks of the type commonly employed in the lifting, transporting, stacking, and depositing of pallet supported loads in confined areas such, for example, as in railway box cars.

In the conventional form of hand lift truck, forwardly extending ground engaging stabilizer arms are fixed adjacent each side of the truck and are adapted to be disposed one each on each side of a pallet supported load which is to be picked up. A truck of this character has usually been equipped with four wheels, one adjacent each forward end of each stabilizer arm and one adjacent each side of the truck body. Because of the relatively short axial length of this type of truck, the center of gravity of the truck and a supported load is located forwardly of the truck body which has required the use of the aforementioned stabilizer arms for maintaining stability of the truck. Obviously when hand trucks, having a pair of stabilizer arms, are used to deposit or stack tiers of pallet supported loads, the tiers cannot be stacked closely adjacent to each other because of the space that must be maintained between them for the positioning of the stabilizer arms on each side of a tier while it is being stacked. In order to take full advantage of all available space, pallet supported loads may be manually stacked between the mechanically stacked tiers. However, this is a difficult, costly, and time consuming process. In addition, when it is desired to remove adjacently stacked tiers of pallet supported loads, it is first necessary to break out alternate tiers manually so that access may be had to the remaining tiers by a hand lift truck of the aforedescribed character.

In my present invention I propose to provide a hand lift truck with only one forwardly extending ground engaging stabilizer arm which will permit tiers of pallet supported loads to be deposited or stacked adjacent to each other and thus eliminate the space that had to be previously maintained between tiers for the positioning of the pair of stabilizer arms. Stability in the truck of my invention is accomplished by disposing one truck body wheel, which is adjacent to the side of the truck to which the stabilizer arm is mounted, rearwardly of a transverse plane passing through the axis of the other truck body wheel and to dispose thereabove a counterweight, which may, for example, as in the embodiment shown, take the form of an internal combustion engine.

By disposing the one truck body wheel laterally rearwardly of the other truck body wheel, the stability of the truck is increased, because the perpendicular distance between the counterweight and a straight line passing through the centers of the other truck body wheel and the wheel adjacent the forward end of the stabilizer arm is increased, which increases the supporting moment of the truck. The supporting moment of the truck is substantially equal to the counterweight times the perpendicular distance from the counterweight to the aforementioned straight line extending between the other truck body wheel and the wheel adjacent the forward end of the stabilizer arm. For stability of the truck the aforedescribed supporting moment must be greater than the load moment which is substantially equal to the weight of the load times the perpendicular distance between the center of gravity of the load and the aforementioned straight line extending between the other truck body wheel and the wheel adjacent the end of the stabilizer arm.

An object of my present invention is to provide a hand lift truck with a single stabilizer arm which will thus permit tiers of pallet supported loads to be deposited or stacked in abutting relation adjacent to each other.

Another object of my present invention is to provide a hand lift truck with two truck body wheels and a wheel adjacent the forward end of the stabilizer arm with the one truck body wheel, which is adjacent to the side of the truck to which the stabilizer arm is mounted, being disposed rearwardly of a transverse plane passing through the axis of the other truck body wheel, for increasing the supporting moment of the truck.

It is a further object of my invention to dispose above the one truck body wheel a counterweight which, for example, as in the embodiment to be described, may, in whole or in part, take the form of an internal combustion engine, for additionally increasing the supporting moment of the truck.

Now in order to acquaint those skilled in the art with the manner of constructing and using devices in accordance with my present invention, I shall describe in connection with the accompanying drawings, a preferred form of my invention.

In the drawings:

Figure 1 is a plan view of the hand lift truck of my present invention; and

Figure 2 is a side elevational view of the hand lift truck shown in Figure 1.

Referring now to Figure 1, there is shown a hand lift truck, indicated generally by the reference numeral 5 having adjacent its forward end a vertical mast 6 comprising fixed spaced apart channel members 7 and vertically extending spaced apart channel members 8 which are adapted to be actuated by conventional hydraulic actuating means 9 disposed between the confines of the members 7. The channel members 7 at the upper ends thereof, are preferably cross connected by a U-shaped channel member 10, as shown in Figure 2.

The vertical mast 6 is provided with horizontal cross frame members 11 and 12 which are secured in a known manner to the vertically extending channel members 8. Secured adjacent each end of the cross member 11, preferably by hook-shaped flanges 14, are a pair of fork members 13 which are adapted to engage a pallet supported load. The fork members 13 are additionally braced by the cross frame member 12.

Projecting forwardly of the main supporting frame of truck 5 adjacent the one side thereof and forming a support therefor, is a stabilizer arm 15, which at its forward end provides for the pivotal support of a wheel 16.

The truck 5 is further supported by a drive wheel 17, rotatably supported in a wheel carrier 18 which is adapted to be mounted in the frame of the truck for rotation about a vertical axis 19, as shown in Figure 1. Also mounted to the wheel carrier 18 for rotation therewith is a conventional hydraulic motor 31 which is connected to the drive wheel 17, in a known manner, by means of a pinion 35 and a gear 36. The operation of the hydraulic motor 31 will be referred to hereinafter. A caster wheel 20 is disposed rearwardly of a transverse plane passing through the axis of the drive wheel 17 and is pivotally supported between the arms of an inverted C-shaped bracket member 21 which is suitably mounted for rotation in the main frame of the truck about a vertical axis 22, as shown in Figure 1.

The truck 5 is preferably powered by a conventional gasoline engine 23 disposed above and adjacent to the caster wheel 20, which is adapted to drive the hydraulic motor 31 by means of a hydraulic control system, shown diagrammatically in Figure 1. The control system comprises an oil sump 24, having a conduit 25 leading therefrom to a pump 26 which is driven by the engine 23. Oil is transmitted under pressure from the pump 26 through a conduit 27 to a valve 28 which controls the flow of oil to the conduits 29 and 30 connected to the hydraulic motor 31 for rotating the latter for forward and reverse drive, and to the conduit 32 connected to the aforedescribed hydraulic actuating means 9 provided for raising the mast 6. Oil is returned from the valve 28 to the sump 24 through a conduit 34.

Steering of the truck 5 is accomplished by means of conventional steering mechanism, shown diagrammatically in Figure 2, comprising a steering arm which is pivotally secured about a horizontal axis to a U-shaped bracket 38 having connection to a vertical shaft 39 pivotally mounted to the truck 5 in a conventional manner. Rigidly secured to the shaft 39 adjacent the lower end thereof is a link 40. The link 40 adjacent its other end is pivotally secured by means of a ball and socket connection 41 to one end of a drag link 42. The other end of the drag link 42 is pivotally secured by means of a ball and socket connection 43 to the aforedescribed wheel carrier 18. The steering arm 37 is provided with a steering handle 44 which is adapted to receive the controls (not shown) for the hydraulic actuation of the drive wheel 17 and of the hydraulic actuating assembly 9 of the mast 6.

The above described hydraulic drive and lift mechanism is exemplary only for use in a truck embodying my invention, and it will be understood that in the broader aspects of my invention other forms of prime movers and conventional mechanical drive means may be suitably supported in the frame of a truck embodying the arrangement of stabilizer wheel, caster wheel, and drive wheel, as described.

The following is a description of the operation of the aforedescribed truck:

The gasoline engine 23 connected to the pump 26, is started in a known manner and oil is drawn from the sump 24 through the conduit 25 to the pump 26. Oil under pressure is released from the pump 26 through the conduit 27 to the valve 28. When it is desired to drive the truck 5 forward, the conduit 29, by means of valve 28 operated by a conventional control lever on the steering handle 44, is connected to the conduit 27, and the conduit 30 is connected to the conduit 34. It will thus be seen that the oil is forced through conduit 29 to the hydraulic motor 31, causing it to rotate. The oil is hence returned from the motor 31 through conduits 30 and 34 to the sump 24, providing a complete circuit for the flow of the oil.

When it is desired to drive the truck 5 backwards, the conduit 30, by means of valve 28 operated by a conventional control lever on the steering handle 44, is connected to the conduit 27, and the conduit 29 is connected to the conduit 34. It will thus be seen that the oil is forced through conduit 30 to the hydraulic motor 31 causing it to rotate in an opposite direction to that which was described above. The oil is returned through conduits 29 and 34 to the sump 34 which also provide a complete circuit for the flow of the oil.

When it is desired to raise the mast 6, the conduit 32, by means of valve 28 operated by a conventional control lever on the steering handle 44, is connected to the conduit 27 so as to induce oil under pressure into one end of the hydraulic actuating assembly 9. When the mast 6 reaches the desired heighth the conduit 32 is disconnected from the conduit 27 and the mast 6 may be held indefinitely at this level.

When it is desired to lower the mast 9 the opposite procedure is followed. That is, the pressure in the conduit 32 is relieved, permitting the weight of the load to force the load supporting means downwardly.

It will thus be seen that the hydraulic system provided for the truck 5 is adapted to raise and lower the mast 6 and drive the hydraulic motor forwardly and backwardly.

The truck is steered by an operator moving the steering arm 37 either right or left which rotates the shaft 39 and the link 40. Rotary movement of the link 40 is translated into substantially rectilinear movement of the drag link 42 which movement effects rotary movement of the wheel carrier 18 to which the drive wheel 17 is pivotally secured.

It will be understood that the supporting movement of the truck 5 may be changed by varying either the backward lateral distance that the caster wheel 20 is disposed with respect to a transverse plane passing through the axis of the drive wheel 17 or by varying the counterweight disposed adjacent to and above the caster wheel 20. Trucks having different load carrying capacities may be constructed by varying the supporting movement by either, or both of the two ways suggested.

While I have shown and described what I consider to be a preferred embodiment of my invention it will be understood that various modifications may be made therein without departing from the spirit and scope of my invention.

I claim:

1. A hand lift truck comprising a body having a pair of first and second wheels one disposed adjacent each side of said body, a single stabilizer arm extending forwardly adjacent one side of said body, a third wheel mounted adjacent the forward end of said stabilizer arm, a vertical mast rigidly supported on the forward end of said body, load supporting means vertically movable in said vertical mast, and drive means for driving said second wheel.

2. The truck of claim 1 wherein said drive means comprises a hydraulic motor.

3. A hand lift truck comprising a body having a pair of first and second wheels one disposed adjacent each side of said body, a single stabilizer arm extending forwardly adjacent one side of said body, a third wheel mounted adjacent the forward end of said stabilizer arm, said first wheel being disposed adjacent the side of said body from which said stabilizer arm extends forwardly and laterally rearwardly of a transverse plane passing through the axis of said second wheel, means for mounting said first and second wheels for rotation about vertical axes, a vertical mast rigidly supported on the forward end of said body, and load supporting means vertically movable in said vertical mast and extending forwardly substantially coextensive with said stabilizer arm.

4. A hand lift truck comprising a body having a pair of first and second wheels one disposed adjacent each side of said body, a single stabilizer arm extending forwardly adjacent one side of said body, a third wheel mounted adjacent the forward end of said stabilizer arm, said first wheel being disposed adjacent the side of said body from which said stabilizer arm extends forwardly and laterally rearwardly of a transverse plane passing through the axis of said second wheel, means for mounting said first and second wheels for rotation about vertical axes, a hydraulic motor for driving said second wheel, a vertical mast rigidly supported on the forward end of said body, and load supporting means vertically movable in said vertical mast.

5. A hand lift truck comprising a body having a pair of first and second wheels one disposed adjacent each side of said body, a single stabilizer arm extending forwardly adjacent one side of said body, a third wheel mounted adjacent the forward end of said stabilizer arm, a vertically pivotally supported wheel carrier for the mounting of said second wheel, steering means having connection with said wheel carrier for effecting rotation thereof about a vertical axis, a vertical mast rigidly supported on the forward end of said body and load supporting means vertically movable in said vertical mast.

6. A hand lift truck comprising a body having a pair of first and second wheels one disposed adjacent each side of said body, a single stabilizer arm extending forwardly adjacent one side of said body, a third wheel mounted adjacent the forward end of said stabilizer arm, said first wheel being disposed adjacent the side of said body from which said stabilizer arm extends forwardly and laterally rearwardly of a transverse plane passing through the axis of said second wheel, means for mounting said first and second wheels for rotation about vertical axes, a counterweight disposed above and adjacent to said first wheel, a vertical mast rigidly supported on the forward end of said body, and load supporting means vertically movable in said vertical mast.

7. A hand lift truck comprising a body having a pair of first and second wheels for supporting the same, a single stabilizer arm extending forwardly adjacent one side of said body, a third wheel mounted adjacent the forward end of said stabilizer arm, a vertical mast rigidly supported on the forward end of said body, load supporting means vertically movable in said vertical mast and extending forwardly substantially coextensive with said stabilizer arm, said first wheel being disposed adjacent the side of said body from which said stabilizer arm extends forwardly and on one side of a vertical plane passing through the median longitudinal axis of said load supporting means, said second wheel being disposed on the other side of the vertical plane passing through the median longitudinal axis of said load supporting means, said first wheel being disposed laterally rearwardly of a transverse plane passing through the axis of said second wheel, and means for mounting said first and second wheels for rotation about vertical axes.

GEORGE L. TURNER.

References Cited in the file of this patent

UNITED STATES PATENTS

| Number | Name | Date |
|---|---|---|
| 1,019,252 | Hill | Mar. 5, 1912 |
| 1,115,666 | Grose | Nov. 3, 1914 |
| 1,199,194 | Lee et al. | Sept. 26, 1916 |
| 1,214,361 | Parker | Jan. 30, 1917 |
| 1,348,003 | Hartsough | July 27, 1920 |
| 2,395,345 | Schreck | Feb. 19, 1946 |